United States Patent [19]
Lattibeaudiere

[11] Patent Number: 5,438,535
[45] Date of Patent: Aug. 1, 1995

[54] CONTENT ADDRESSABLE MEMORY SYSTEM

[75] Inventor: Derrick P. Lattibeaudiere, Newark, Del.

[73] Assignee: Panasonic Technologies, Inc., Princeton, N.J.

[21] Appl. No.: 219,639

[22] Filed: Mar. 29, 1994

[51] Int. Cl.⁶ .............................................. G11C 15/00
[52] U.S. Cl. ..................................... 365/49; 365/221; 365/230.08; 365/189.05
[58] Field of Search ...................... 365/49, 221, 230.08, 365/189.05, 230.03, 238.5; 395/425

[56] References Cited

U.S. PATENT DOCUMENTS

| | | | |
|---|---|---|---|
| 4,813,002 | 3/1989 | Joyce et al. | 365/49 |
| 4,831,586 | 5/1989 | Nakagawa et al. | 365/49 |
| 5,239,642 | 8/1993 | Gutierrez et al. | 395/425 |

OTHER PUBLICATIONS

T. Ogura et al., "A 4–kbit Associative Memory LSI", *IEEE Journal of Solid–State Circuits*, vol. SC–20, No. 6, pp. 1277–1282 (Dec. 1985).

H. Kadota et al., "An 8–kbit Content–Addressable and Reentrant Memory", *IEEE Journal of Solid–State Circuits*, vol. SC–20, No. 5, pp. 951–957 (Oct. 1985).

Naganuma, et al, "High–Speed CAM–Based Architecture for a Prolog Machine (ASCA)", *IEEE Transactions on Computers*, vol. 37, No. 11, pp. 1275–1383 (Nov. 1988).

L. Chisvin et al., "Content–Addressable and Associative Memory: Alternatives to the Ubiquitous RAM", *IEEE Computer*, pp. 51–63 (Jul. 1898).

C. Stormon, "A General–Purpose CMOS Associative Processor IC and System", *IEEE Micro*, pp. 68–77 (Dec. 1992).

"Am99C10A 256×48 Content Addressable Memory", Advanced Micro Devices, pp. 5-3-5-22, (Mar. 1991).

*Primary Examiner*—Joseph A. Popek
*Assistant Examiner*—Huan Hoang
*Attorney, Agent, or Firm*—Ratner & Prestia

[57] ABSTRACT

A content addressable memory (CAM) system, is disclosed for writing data including a key portion and an extended portion, and for reading the extended portion in response to the match of a search key a key portion of the data. The system includes a conventionally addressed RAM, organized into segments, each segment of which is identified by a starting address. It also includes a CAM, also organized into words. Each of the words of the CAM is identified by a CAM address. Data to be written into the memory includes a key portion and an extended data portion. The key portion of the data is written into the CAM at a selected address, and the extended data portion is written into a segment of the random access memory which begins at an address determined from the selected address. Data in the random access memory is read by searching the CAM for a search key and then using address of matching entries found in the CAM to generate address values for the random access memory. The random access memory is then addressed to fetch the extended data associated with each of the matching entries. In one exemplary embodiment, the memory system is used to hold a database of television programs in a cable television scheduling system.

8 Claims, 8 Drawing Sheets

| 31 | 24 | 23 | 16 | 15 | 0 |
|---|---|---|---|---|---|
| DATA_WRITE CMD | | CAM_ADDR | | DATA_KEY | |

FIG. 2a

| 31 | 24 | 23 | 16 | 15 | 0 |
|---|---|---|---|---|---|
| MASK WRITE CMD | | NOT USED | | MASK_KEY | |

FIG. 2b

| 31 | 24 | 23 | 16 | 15 | 0 |
|---|---|---|---|---|---|
| COMPARE CMD | | NOT USED | | SEARCH_KEY | |

FIG. 2c

CONTENT ADDRESSABLE MEMORY SYSTEM

FIELD OF THE INVENTION

This invention relates to memory devices, and more particularly to a free-standing content addressable memory system which can be used to hold a database.

BACKGROUND OF THE INVENTION

Many systems which rely on databases employ a keying scheme to aid in the searching of the database. Records in the database are stored in a somewhat random order and then an index is generated to link the database records into sequence based on a portion of the data. This portion is commonly referred to as the key.

In conventional data processing systems, the construction of the index and the accessing of the data based on the index file may require a number of processing steps. This method of storing and accessing data is not appropriate, therefore, in a real-time processing environment in which data must be processed quickly. In addition, for databases having relatively small records, the index file may be almost as large as the database itself.

In video scheduling, for example, a particular program schedule is likely to be built up a bit at a time, with the broadcast time of some programs being decided before the broadcast time of other programs, and with frequent changes in the lineup. This has the result that when the data relating to the program time is stored in memory, the starting and ending times of the various programs are in a random order in the memory.

It is likely, in fact, that the broadcast time of the most popular or important programs will be decided early during the program-generation process, with less-important or "filler" programs being decided later, and changed frequently. The problem is exacerbated when many short commercial messages must be interspersed with the main program. Many broadcast stations have random-access automated television tape cartridge players, which can accept instructions, for example from a scheduling computer, to play particular tapes in the system in any order.

In order to automate such a system, the desired identified program selections must be placed in a database, together with their starting and ending times, and frequent comparisons must be made between the current time and the starting and ending time of each program in the database. A conventional computerized scheduling system must either use an indexed database, such as the one described above, or it must sequentially search all the database entries at each time of interest. If there are a large number of entries, the search time may be considerable, and may preempt the operations of the scheduling computer during the comparisons. This preemption can cause delays in implementing last-minute schedule changes since the scheduling computer cannot be used to add information to the database or to review the existing schedule while it is searching for the next scheduled event.

The duration of each search may increase the minimum time increment between adjacent starts and stops. This may be disadvantageous, as some commercial messages may be as short as ten seconds, and they may conceivably have an even shorter duration. It is undesirable to have a minimum time interval or increment in such a control system, because it reduces the flexibility of the system for operators.

Content-addressable memories (CAM) are known to bypass the sequential-access limitations of conventional random-access memories, as described, for example, in the articles *Content-Addressable and Associative Memory: Alternatives to the Ubiquitous RAM*, by Chisvin et al., published at pp 51–63 of the July, 1989 issue of COMPUTER, published by IEEE, and *A General-Purpose CMOS Associative Processor IC and System*, by Storman et al., published at pp 68–77 of the December, 1992 issue of IEEE Micro. As pointed out in the Storman et al. article, there are no general-purpose content-addressable memories, because of considerations of word hits and word length. A CAM system adapted for use in the control of video or audio programming is desired.

SUMMARY OF THE INVENTION

The present invention is embodied in a free-standing content addressable memory (CAM) arrangement, which holds data for a database including a key portion and an extended portion. The extended data may be accessed in response to a search key which matches or is associated with the key portion of the data. The key portion is held in a conventional CAM while the extended data portion is held in a conventional random access memory (RAM).

According to one aspect of the invention, the extended data is arranged in segments in the RAM, each segment being identified by a starting address.

In one embodiment of the invention, each database record spans several multi-bit words, the CAM stores one such word, and the conventional RAM stores the remaining words associated with each database record. Each of the words of the content-addressable memory portion is identified by a CAM word address. A writing arrangement is coupled to the random access memory and to the content-addressable memory, for accepting data to be written into memory, which data to be written includes a key portion and an extended portion, for writing the key portion of the data into the content addressable memory at a selected address thereof, and for writing the extended portion of the data into a segment of the random access memory which is derived from the selected address at which the key portion is written into the content addressable memory.

In another aspect of the invention, the data in the RAM may be read by supplying a search key to the CAM and simultaneously searching at least a portion of the data in the CAM to identify entries that match at least a portion of the search key. When all such entries have been identified, their addresses are provided in sequence such that all extended data entries in the database which correspond to the search key may be provided sequentially to the host processor.

According to yet another aspect of the invention, the entries in the CAM may include cell control bits which allow the data in the database to be functionally restricted into classes which may influence search operations.

A particular embodiment of the invention finds application in a video or cable television scheduling system.

DESCRIPTION OF THE DRAWINGS

FIG. 2a illustrates the format of a COMMAND word conveying a DATA_WRITE command, FIG. 2b illustrates the format of a COMMAND word conveying a MASK_WRITE command, and FIG. 2c illustrates a COMMAND word conveying a COMPARE command;

DESCRIPTION OF THE INVENTION

Information or data for a database according to the invention are carried by two types of words, a COMMAND word, which has a fixed number of bits, such a 32 bits, and one or more EXTENDED DATA words, each of which also has a fixed number of bits, such as 32. Each combination of a command word and a group of EXTENDED DATA words constitutes a record of the database. In this record, various fields are defined.

Records are stored into, and fetched from the database by issuing commands to the memory. One 32-bit word is used for the command. If the command is to store a record into the memory, the EXTENDED DATA words which constitute the record are provided to the memory immediately after the command word. In general, the COMMAND words are processed in association with the content-addressable portion of the CAM system, and the EXTENDED DATA words associated with the various COMMAND words are stored in conventionally addressed random-access memory (RAM), all as described in more detail below.

Figure 1:
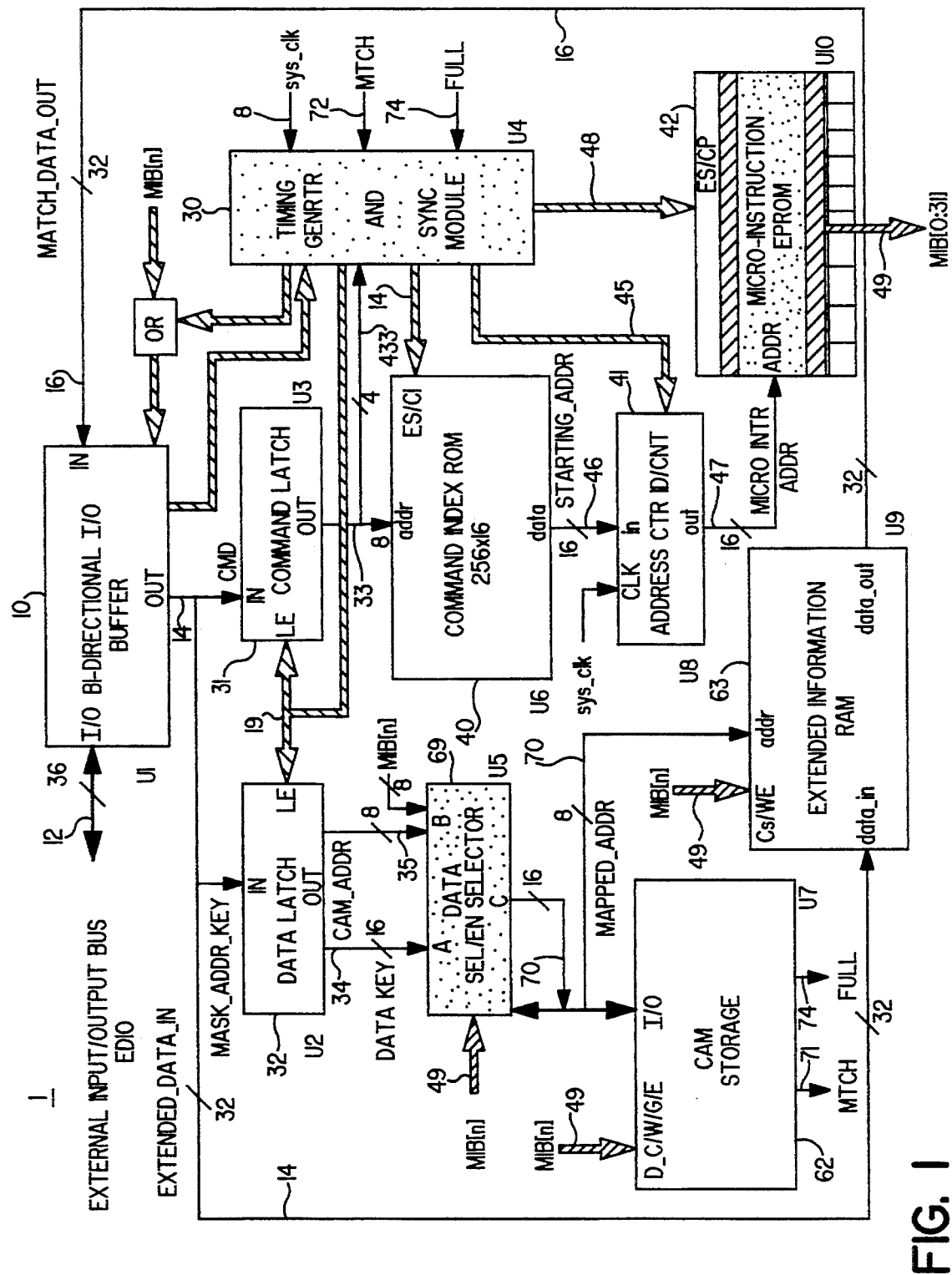
FIG. 1 is a simplified block diagram of a content-addressable memory arrangement according to the invention, which includes an input/output buffer, a timing generator and synchronization (TGS) module, command and data latches, a command index read-only memory (ROM), an address counter, a micro-instruction electrically programmable read-only memory (EPROM), a data selector, a content-addressable memory (CAM) and an extended-data RAM.

FIG. 1 is a simplified block diagram of a content-addressable memory system 1 having an architecture in accordance with the invention, which operates generally as described above. In FIG. 1, data to be stored is received from a host processor at an input-output (I/O) port of a bidirectional buffer 10 (also designated U1) over a 36-bit external data input/output (EDIO) bus 12, and data retrieved from storage is coupled out over the EDIO bus 12 to the host processor. Buffer 10 is a temporary store for data entering and leaving the memory system.

The information carried by each 32-bit COMMAND word applied over bus 12 of FIG. 1 may be classified into one of four broad groups, depending upon the function to be performed, (a) command, (b) search key, (c) data mask, and (d) address. The data carried by the EXTENDED DATA word(s) is (e) extended information.

In general, the COMMAND words each contain three fields, which carry two or more of the command code, search key, data mask, and address information, and the information in the COMMAND word is processed in association with the content-addressable memory portion of the architecture. The CAM information in the COMMAND word, in turn, identifies by its address the starting address of the fixed-size segment of extended information stored in the associated RAM. Each COMMAND word applied to the CAM includes an eight-bit Command (CMD) code in its most significant byte position.

The Command code specifies the function to be performed by the memory system; whether information is to be stored in content-addressable memory, compared with information already stored in content-addressable memory, or used to modify the operation of the memory system. The command code also aids in decoding the other fields of the COMMAND word. In addition to a Command code, each COMMAND word includes a second field, in its least significant two bytes, which may be (i) a data key (DATA_KEY), (ii) a mask key (MASK_KEY), or (iii) a search key (SEARCH_KEY). If the field holds a MASK_KEY, it is transferred to the mask register of the CAM 62. If it holds a SEARCH_KEY, the key is used to search the data in the CAM 62. If the field holds a DATA_KEY the key is stored in the CAM 62. In addition to Command and key portions, a COMMAND to store data into the CAM 62 includes a CAM address, which specifies the location within CAM at which the search key is stored.

Figure 3:
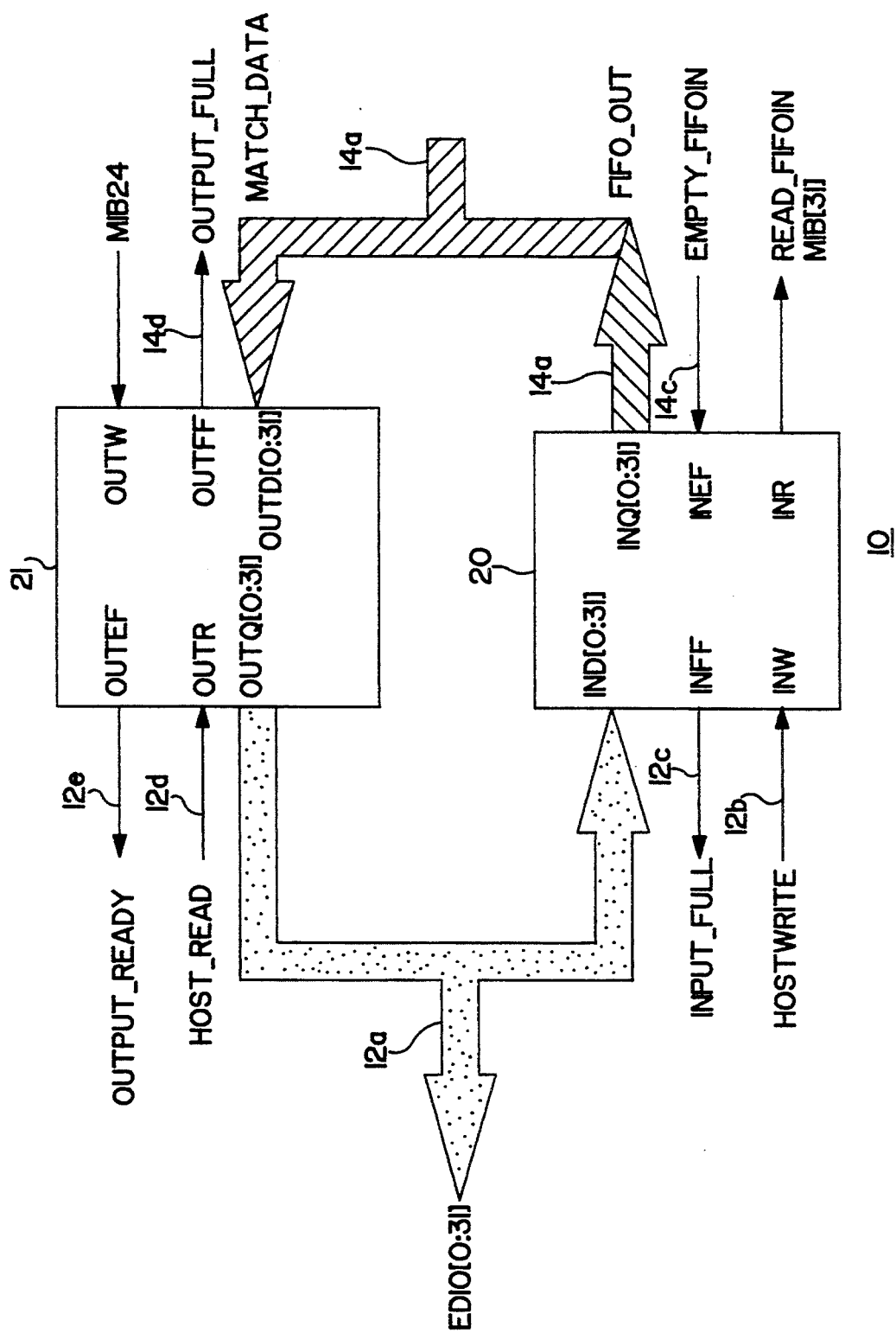
FIG. 3 is a simplified block diagram of the input-output buffer of FIG. 1.

FIG. 3 is a block diagram of circuitry suitable for use as the bidirectional I/O buffer 10. Referring to FIGS. 1 AND 3, four of the bit lines of 36-bit EDIO bus 12 of FIG. 1 are control lines, and the remaining 32 bit lines are for data. Two of the four control bit lines of 36-bit bus 12, namely control lines 12d and 12b, are used for input control signals designated HOST_READ and HOST_WRITE, respectively. The other two control lines, namely control lines 12e and 12c, carry output control signals designated OUTPUT_READY and INPUT_FULL, respectively. For simplicity, the control lines themselves may be named with the name of the signals which they carry. The remaining 32 bits of 36-bit bus 12 are available to carry data, including the above mentioned COMMAND and EXTENDED_DATA words.

In order to communicate with the memory system of FIG. 1, a 32-bit COMMAND data word is loaded onto the 32 bit data portion of EDIO bus 12, and the HOST_WRITE control line is asserted by applying a signal to switch the HOST_WRITE control line 12b from a logic high state or level (logic 1) to a logic low level (logic 0). This transition causes 32 data bits on EDIO bus 12 to be transferred into buffer 10. In the exemplary embodiment of the invention, the buffer 10 has a capacity of 256 32-bit words.

If buffer 10 is temporarily full, and can accept no data, the buffer 10 notifies the host processor (not shown) of this condition by asserting a logic 0 on the control signal INPUT_FULL control line 12c of bus 12. If the host processor ignores this signal and attempts to write data to the buffer, the buffer 10 will ignore the HOST_WRITE signal and the data may be lost.

Once the INPUT FULL control signal has been asserted, the buffer 10 remains full until it is read, whereupon new data can once again be written into the buffer by asserting the HOST_WRITE signal. After data has been written into buffer 10 from the EDIO bus 12, it is read by the remainder of the system of FIG. 1 and processed in accordance with the command portion of the data.

FIG. 2a illustrates the format of a 32-bit DATA_WRITE command word, which includes an eight-bit command (CMD) field in the eight most-significant bits (MSB) of the command word, extending from bit 24 to bit 31; an eight-bit CAM address field (CAM_ADDR) extending from bit 16 to bit 23; and a sixteen-bit data key portion (DATA_KEY) extending from bit zero to bit 15. The 32-bit EXTENDED DATA word(s) associated with the command word of FIG. 2a are not restricted in format and, so, are not illustrated.

The Command field of the command word is only used to control the operation of the memory system, it is not stored in the CAM as a part of the DATA_WRITE command. The command word of FIG. 2a is used in an ordinary information-write operation, in which the information in the DATA_KEY field is stored in the CAM 62, while the associated EXTENDED DATA words (not illustrated in FIG. 2a) are stored in the RAM 63. The association of the extended data in RAM with the search key stored in CAM is maintained by re-use of a portion of the CAM address field. As mentioned, the DATA_KEY field of a command word is stored in CAM at the address specified in the CAM_ADDR field of the command word.

The CAM address in the DATA_WRITE command (CAM_ADDR) is selected to be the address of an empty word in CAM 62, or of a word which has no further use and can be overwritten. In the exemplary embodiment of the invention, all allocation and deallocation of memory locations is handled external to the memory system shown in FIG. 1. The address specified in the CAM_ADDR field is also used as the segment address in the RAM 63 at which the extended data portion of the information is stored in RAM. Since the size and number of the EXTENDED DATA words associated with each CAM entry is fixed, the locations of the EXTENDED DATA words can be determined as offsets from a segment address generated from the CAM_ADDR field. In one exemplary embodiment of the invention, the segment address is generated by concatenating two logic-zero bits in the least significant bit (LSB) positions of the CAM_ADDR value. This address points to the first EXTENDED DATA word in the RAM 63. Using this scheme, up to four EXTENDED DATA words may be stored in the segment by incrementing this address value. This addressing scheme has the advantage that the extended information may be referenced using the address at which the data key information is stored. It is contemplated that other numbers of EXTENDED DATA words may be accommodated using similar addressing schemes.

As mentioned, the CMD fields of FIGS. 2a, 2b, and 2c each have eight bits. This allows for 256 distinct commands, not all of which are used, thereby allowing for expansion of the functions from those described. As described above, there are three commands, namely DATA_WRITE, MASK_WRITE, and COMPARE (search). Two bits are sufficient to convey these three commands. The value of the command field for a DATA WRITE command is 0×01, where the prefix "0×" indicates hexadecimal notation. The value of the field for a MASK_WRITE command is 0×02, and the value of the field for a COMPARE command is 0×03.

The CAM_ADDR portion of the DATA_WRITE command word of FIG. 2a is eight bits, allowing for 256 CAM addresses. If more than 256 CAM memory locations are desired, the number of bits in the CAM_ADDR field must be greater than eight. The Command field and the CAM address field of the command word of FIG. 2a together use sixteen bits. The remaining sixteen less-significant bits represent the key portions of the data being stored. It is this portion which is ultimately stored in content-addressable memory 62 and which is used for searching.

When a DATA_WRITE command is specified by the Command field, the command is transferred as a 32 bit word from the EDIO bus 12 to buffer 10. Next, the EXTENDED DATA words destined for the Extended data RAM 63 are transferred, one word at a time, from EDIO bus 12 of FIG. 1 to buffer 10 by repeated assertions of the Host-Write control signal on one of the four control lines of bus 12. The EXTENDED DATA words are applied in succession immediately following the word containing the DATA_WRITE command. The combination of the DATA_WRITE command and these EXTENDED DATA words forms one extended information data packet (i.e. one database record). The content of this packet depends upon the application for which the system is used. Thus, there is one leading 32-bit command word for every extended information packet, no matter how many 32-bit words the extended information packet may contain.

The number of bits in each word of the EXTENDED DATA may vary from one application to the next, but within one application, the number of bits is constant. In a particular example of a CAM arrangement used for scheduling in a cable television environment, packets of four 32-bit words of extended information are allowed.

FIG. 2b illustrates the format of a 32-bit MASK_WRITE command word. This format is similar to that of the DATA_WRITE command. The CMD field is 0×02, and the command further includes a sixteen-bit mask key field (MASK_KEY) extending from bit zero to bit 15. The portion of the MASK_WRITE command from bit 16 to bit 23 is unused. When a MASK_WRITE command is executed, a sixteen-bit mask is written, as described below, to a mask register internal to the CAM. The mask bits enable or disable the corresponding bits of the SEARCH_KEY described below, to effectively establish those bits which participate in the comparison operations.

By specifying a MASK_KEY, a user may partition the search keys into active and inactive portions. A logic low or logic 0 (0) in a particular mask bit position means that the bit participates in a search or comparison, while a logic high or logic 1 (1) means that the bit is excluded from participation in the search or comparison. No information is written to the RAM 63 or into any of the data cells of the CAM 62 during a MASK_WRITE cycle. A single write to buffer 10 of FIG. 1 suffices to initiate a MASK-WRITE cycle.

FIG. 2c illustrates the format of a 32-bit command word conveying the COMPARE command. As shown in FIG. 2c, this command includes a CMD field of 0×03 and a sixteen-bit SEARCH_KEY field extending from bit 0 to bit 15. Bits 16 through 23 of this command are unused. When a COMPARE operation is executed, information in the SEARCH_KEY field, as modified by any mask information, is compared with each of the CAM memory locations. As described above, the bits of mask word, previously stored in the CAM 62 determine which bits of the SEARCH_KEY information will participate in the comparison.

If a match is found, in response to a COMPARE command, between the masked SEARCH_KEY information and the previously stored DATA_KEY information, the address or addresses in the CAM 62 at which the corresponding DATA_KEY information are stored are produced as the output of the CAM. These addresses are then used as a segment index or address to access the EXTENDED DATA stored in the corresponding segment of RAM, to retrieve the entire multi-word information associated with the CAM words that matched the masked search key. The EXTENDED DATA words retrieved from the memory 63 are then returned to the host processor (not shown) via the bidirectional I/O buffer 10 and the EDIO bus.

This memory system effectively implements a content addressable database. The relationship or association of the key information, as stored in the CAM 62, with the remainder of the database record, as stored in the RAM 63, is maintained by firmware. The user reads the output data from buffer 10 until it is empty, to retrieve all of the data in the memory system that is associated with the key, as masked by the provided mask value.

The CAM internal structure provides for additional bits referred to as Cell Control Bits, which are individually programmable, to provide the ability to determine whether or not a specific storage location participates in any subsequent comparison operations. Two such Cell Control Bits are Empty-Bit and Skip-Bit. The Empty-Bit bit indicates that its associated storage location is full or empty, while Skip-Bit determines whether the associated storage location should participate in the next comparison. The Skip-Bit is used when multiple matches are found in response to a comparison operation, to successively skip the locations to reach the next location at which a match was found. The Skip-Bit can be used for controlling access to selected entries in the CAM and, thus, to EXTENDED DATA words associated with these entries.

It is contemplated, however, that by adding commands to set and reset the skip bits, this function of the CAM may be used to further classify data in the database. One such classification, for example, may be to differentiate customers who have paid for pay-per-view services from those who have not.

FIG. 3 is a more detailed block diagram of bidirectional input/output buffer 10 of FIG. 1. Elements of FIG. 3 corresponding to those of FIG. 1 are designated by like reference numerals. In FIG. 3, buffer 10 includes a first-in, first-out (FIFO) buffer 20, which has its 32-bit input port IND coupled to a 32-bit portion 12a of the EDIO bus 12 of FIG. 1. A control input terminal, INW, of the FIFO 20 is coupled to a control line 12b of bus 12 to receive the HOST_WRITE control signal, and an output input terminal, INFF, coupled to a control line 12c, by which the INPUT_FULL signal may be provided by the FIFO 20 to the host processor (not shown).

The FIFO buffer 20 operates as a conventional FIFO memory, requiring no address information, but simply storing information provided at its input port, and allowing the stored information to be read at its output port in the same order that it was written. Data is written by applying the data to be written to the data input port, which in the case of FIFO buffer 20 is the IND input port, and asserting the write control signal (the "input clock" for the FIFO) at input terminal INW, by way of control line 12b. The control signal INW is switched from logic 1 to logic 0, and back to logic 1 again, whereupon the 32 bit data value supplied via the EDIO bus is stored in the next memory location of the buffer.

Reading is similarly accomplished by asserting a READ_FIFOIN control signal on input INR by way of a control line MIB[31] of a microinstruction bus (MIB), described in more detail below. In response to this control signal, the oldest word currently stored in the FIFO buffer 20 appears at an output port, which in the case of FIFO buffer 20 is designated INQ, and on an output bus 14a.

Conventional FIFO memories or buffers provide additional control signals, which are used as described below. One such control signal, which may be designated EMPTY_FIFO, indicates by a logic 0 level at the INEF output of buffer 20, and on control line 14c, that the input buffer is empty. Another such control signal, which may be designated FIFO_FULL, appears at the INFF output port of FIFO buffer 20 and on control line 12c, and is used to indicate by an INPUT_FULL logic 0 status that the buffer is full.

Another FIFO buffer 21 of FIG. 3 has its 32-bit output port OUTQ coupled to the 32-bit data portion 12a of the EDIO bus, and receives data, designated MATCH_DATA, at its 32-bit input port OUTD from bus 14a. FIFO buffer 21 also includes a control input port OUTR, which is coupled to EDIO bus control line 12d, to allow information stored in the buffer 21 to be read by the host processor application of a logic 1, followed by a logic 0 and a logic 1, as described above. The FIFO buffer 21 also includes a control output port OUTEF, which indicates by a logic 0 on a control line 12e of bus 12 that the buffer is not empty and, so, may be read.

Buffer 21 of FIG. 3 also includes a single-bit OUTFF control output terminal, which is coupled to an OUTPUT_FULL control line 14d. This signal indicates by a logic 0 that the buffer is full. When the signal OUTFF is logic 0, no match data may be stored into the FIFO buffer 21 until the host processor reads some of the match data already stored in the buffer 21. Control signals to store data into the FIFO buffer 21 are provided by a single-bit control input port OUTW, which is coupled to a microinstruction control line designated MIB24.

Together, FIFO buffers 20 and 21 of FIG. 3 act as a bidirectional input-output buffer, designated 10 in FIG. 1. The combined effect of the configuration of FIG. 3 is that data from the EDIO bus is always written to FIFO buffer 20, and data read by the user is always read from FIFO buffer 21.

Timing Generator and Synchronization (TGS) module 30 (U4) of FIG. 1 generates the appropriate electrical control signals at the appropriate instants, so that signals are transferred through the system in the proper manner. It also synchronizes the various control signals with a system clock. The controller can be implemented by various arrangements which are generally known to those skilled in the art, and which are equivalent to the structure described below.

In a specific embodiment of the invention adapted for the above mentioned cable television programming system, Timing Generator and Synchronization (TGS) module 30 is implemented as a 13*80*8 programmable sequence generator using a Texas Instruments PSG507M device, in which the "13" represents the total number of digital signals which the device may receive, the "80" refers to the total number of distinct combinatorial logical AND operations which may be performed under program control among the thirteen inputs, and the "8" refers to the total number of digital output signals which may be produced simultaneously.

The TGS module 30 has an additional internal six-bit binary counter, the state of which may be internally monitored, for controlling the logical operations based upon a particular count. For example, the device may be programmed as a finite state machine in which a particular sequence of logical outputs occurs for a given set of input signals and successive count values. For example, the TGS module may generate a logic 1 level on output Q7 whenever the internal counter reaches a count of eight, if its I7 input port is at a logic 0 state. In the exemplary embodiment, the TGS module is programmed, as described below, using the ABEL language, available from DATA IO Corp.

The TGS module 30 includes a conventional microprogrammed sequencer. It generates control signals which condition an internal read only memory, shown in FIG. 5 as EPROM 42, to provide control signals for all of the other devices in the CAM memory system. These control signals are provided via a 31-bit microinstruction bus (MIB) 49. In the materials that follow, a particular signal on the microinstruction bus is referred to by its number. For example, MIB[31] indicates the thirty-first control signal provided via the microinstruction bus MIB.

Figure 4:
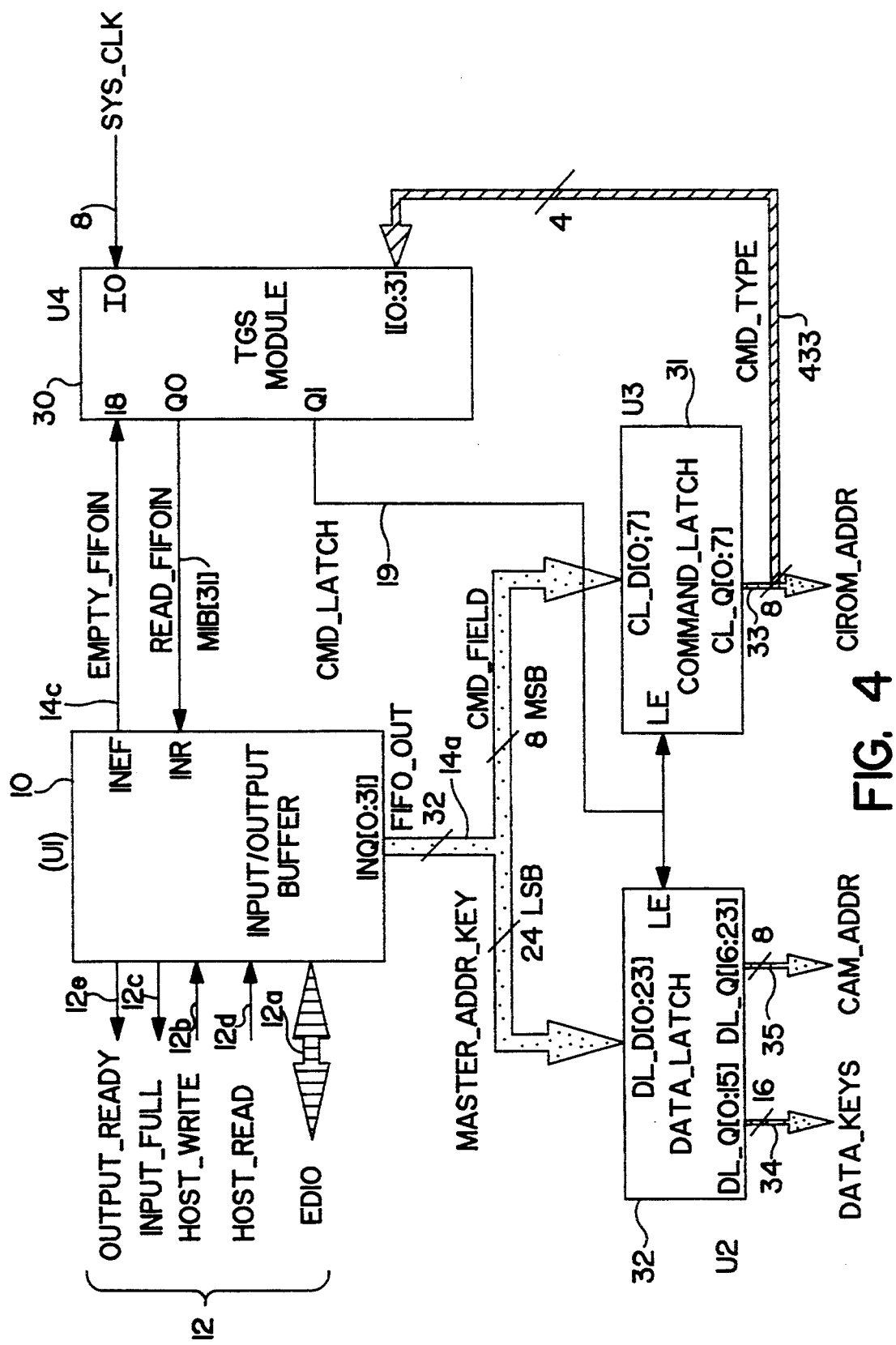
FIG. 4 is a simplified block diagram of the input/output buffer, TGS module, command and data latch portions of FIG. 1.

In FIG. 4, the 32-bit data output bus 14a of input/output buffer 10 is subdivided, with the eight most significant bits (MSBs), carrying the Command field and the twenty-four least-significant bits representing a data field. The FIFO empty control signal EMPTY_FIFOIN is coupled from the INEF port of input/output buffer 10 by way of control line 14c to input port I8 of TGS module 30. The read control signal input port INR of input/output buffer 10 is coupled by control line MIB[31] to the READ_FIFOIN output port Q0 of TGS module 30. The latch enable signal CMD_LATCH is coupled from the Q1 output port of TGS module 30 to the latch enable (LE) ports of latches 31 and 32 by way of a path 19.

Latches 31 and 32 transfer their input signals to their output ports when the LE port is raised to a logic 1 level, which is often referred to as a "transparent" mode of operation. When the LE input signal transitions from the logic 1 level to the logic 0 level, the output signal is held until the next time the LE input signal again becomes logic 1. By this configuration, the TGS module may control latches 31 and 32 at the appropriate time to temporarily store the command and data portions of a word from input/output buffer 10.

Whenever data words are written into bidirectional input/output buffer 10 of FIGS. 1, 3 and 4, the control signal EMPTY_FIFOIN becomes logic 1 indicating that data is available to be read. This control signal is coupled to TGS module 30. TGS module 30 recognizes the control signal as indicating that action is required, and responds by generating the READ_FIFOIN control signal. This control signal causes the FIFO buffer 20 to provide one 32-bit word at its output port to the bus 14a.

In addition, the TGS module 30 generates a CMD_LATCH control signal to transfer the 32-bit data word from bus 14a to a command latch 31 and a data latch 32. The eight most-significant-bits of each word, representing the command, are routed to input port CL_D of command latch 31, and the remaining twenty-four bits are routed to input port DL_D of data latch 32. The lower four bits, designated CMD_TYPE, of the eight-bit Command field are in turn routed by a data path 433 to input ports I0 through I3 of TGS module 30. In response to these signals, the TGS module decodes the command to determine what type of action the user has requested. The decoded request is then used to generate signals appropriate to the DATA_WRITE, MASK_WRITE, or COMPARE command. More system capability (i.e. a greater number of command types) may be achieved, if desired, by routing all eight bits of the command to the TGS module for decoding.

Synchronization of the control signals with the system clock for smooth transfer of data from input/output buffer 10 of FIGS. 1, 3 and 4 to latches 31 and 32 begins when the control signal EMPTY_FIFO undergoes a transition from logic 0 to logic 1, indicating that the input FIFO buffer 20 is no longer empty. The EMPTY_FIFO signal on control line 14c is made synchronous with the system clock on clock line 8 by generation, within TGS module 30, of a signal called Continue_Processing (not shown).

The Continue_Processing signal is asserted to a logic 1 level on the first rising edge of the system clock (SYS_CLK) received at input port I0 after the EMPTY_FIFO signal becomes logic 1. The Continue_Processing signal remains a logic 1 until the input FIFO 30 of the input/output buffer 10 is empty, as indicated by a transition to logic 0 of the EMPTY_FIFO signal. The Continue_Processing signal is used by TGS module 30 to continue reading instructions and data from the input/output buffer 10 until no more data are available to be read from buffer 10 for processing. Once the Continue_Processing signal becomes logic 0, the TGS module waits until the signal EMPTY_FIFOIN again becomes logic 1 before starting the process again.

In response to the Continue_Processing signal becoming logic 1, TGS module 30, on the next positive-going transition of the system clock, simultaneously asserts both the READ_FIFOIN and the CMD_LATCH control signals from a logic 0 to a logic 1 level. The READ_FIFOIN signal is held at logic 1 for one period of the system clock, and the CMD_LATCH signal is held at logic 1 for two periods of the system clock. When the READ_FIFOIN signal is returned to a logic 0 level after one system clock period, the logic 1 to logic 0 transition causes input/output buffer 10 to transfer the stored 32-bit data to its INQ output port.

When the CMD_LATCH is returned to a logic 0 level after two system clock periods, which is one clock period after the READ_FIFOIN signal becomes logic 0, the logic 1 to logic 0 transition causes latches 31 and 32 to latch the data currently at their input ports, with the most significant eight-bit byte latched to command latch 31, and the three less-significant bytes latched to data latch 32.

Thus, two system clock cycles after a non-empty buffer condition is detected, data is transferred from input/output buffer 10 to latches 31 and 32, the data in latch 31 represents command information, and the data in latch 32 represents data to be stored, mask or comparison information. Further, two system clock cycles after a non-empty buffer condition is detected, four bits of the command are available to the TGS module 30 for decoding to determine the command type.

Figure 5:
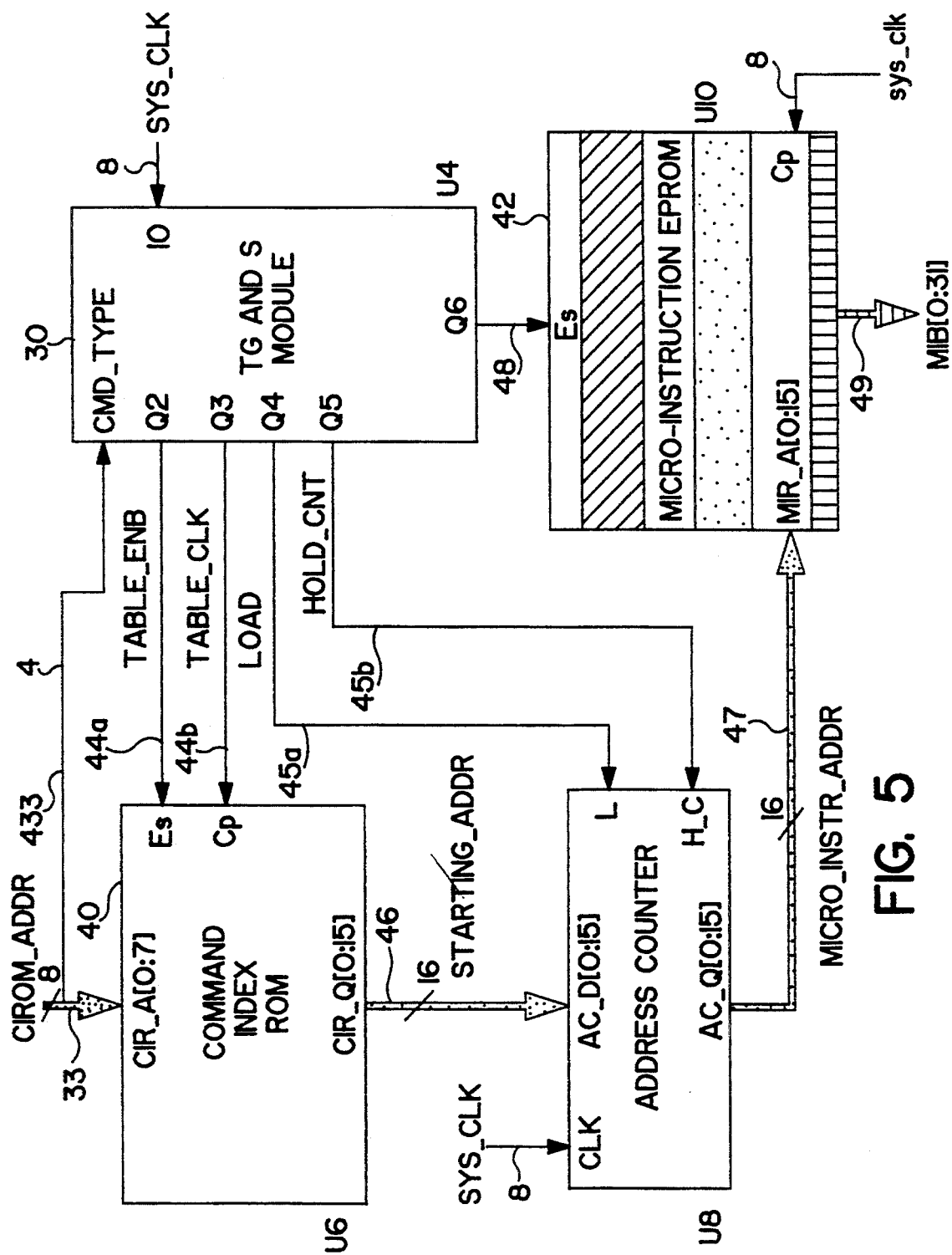
FIG. 5 is a simplified block diagram of the command index ROM, address counter and micro-instruction EPROM of FIG. 1.

Referring to FIGS. 1 and 4, the eight-bit command data stored in command latch 31 is collectively designated CIROM_ADDR, and is coupled from the output port of latch 31 by way of a data path 33 to address input port CIR_A of a command index ROM 40 (U6), shown in FIG. 5. The least significant four of the eight bits (the four LSBs) stored in command latch 31, collectively designated CMD_TYPE, are also applied by way of a data path 433 to four of the thirteen input ports available on TGS module 30. ROM 40 is a look-up table. In response to a command type, as indicated by the signal CIROM_ADDR, it provides a starting address of a block of microinstructions stored in EPROM 42 (U10) which implement the command.

When ROM 40 is addressed by the command type, the starting address corresponding to that command is applied from the CIR_Q output port of ROM 40, over bus 46 to the input port AC_D of an address counter 41 (U8). Functionally, ROM 40 and address counter 41 work together to produce a series of consecutive addresses, starting with the address stored in the memory location accessed in ROM 40 by the command word. The count is controlled by TGS module 30.

The sequence of address values for a each decoded command are produced at the AC_Q output port of address counter 41 and are applied to the address input port of the microinstruction erasable programmable ROM (EPROM) 42. The sequence of addresses causes EPROM 42 to step through a series of microinstructions. The microinstructions, in turn, generate the command-specific control signals required to complete the requested instruction. In the exemplary embodiment of the invention, these instructions perform a data write, mask write, or compare function.

Each user command is ultimately associated with or occupies a unique range or block of addresses of EPROM 42. When a command-representative address is applied to the CIR_A input port of ROM 40, it produces a single sixteen-bit starting address on its output port CIR_Q for application over bus 46 to address counter 41, and counter 41 steps through 32 counts, to sequentially produce, on a data path 47, a block of 32 addresses, each greater than the previous address. EPROM 42 is sequentially addressed by the incrementing addresses from counter 41, thereby producing a sequence of 32-bit words at its output port for application to a microinstruction bus (MIB) 49.

In FIG. 5, the system clock signal, SYS_CLK, is applied over path 8 to input port I0 of TGS module 30. An enable input control signal, TABLE_ENB, is produced at the Q2 output port of TGS module 30, and is applied over a control line 44a to the enable input port Es of command index ROM 40. A signal, TABLE_CLK, is produced at the Q3 output terminal of TGS module 30, and is applied over a data path 44b to the Cp input port of ROM 40. The signal TABLE_CLK is used to sequence the command index ROM 40 in conjunction with the TABLE_ENB signal.

The output port CIR_Q of ROM 40 is disabled on the first logic 0 to logic 1 transition of the TABLE_CLK signal following the transition of the TABLE_ENB signal to a logic 1 state. The port CIR_Q remains disabled until the first logic 0 to logic 1 transition of the signal TABLE_CLK following a transition of TABLE_ENB to a logic 0 state. When ROM 40 is enabled, the signal at the CIR_Q output port represents the starting address in the microinstruction EPROM 42 of the instructions that implement the command code provided via the eight-bit CIROM_ADDR signal.

The relative timing of the TABLE_ENB and the TABLE_CLK signals is established by the TGS module 40, which asserts TABLE_ENB to a logic 1 level on the next positive-going transition of the system clock signal following the assertion of the Continue_Processing signal to a logic 1 state. The signal TABLE_ENB is held at logic 1 for three system clock periods, and then returned to the logic 0 level. On the positive-going transition of the fifth system clock pulse after the Continue_Processing signal becomes logic 1, the signal TABLE_CLK is held at a logic 1 state for one system clock cycle, so that it returns to the logic 0 level on the positive-going transition of the sixth clock pulse.

In the circuitry shown in FIG. 5, the command index ROM 40 is disabled while its address input value is being latched and stabilized on input data path 33. During the next system clock cycle following stabilization of the address lines, output port CIR_Q is enabled, and on the fifth clock pulse the data which is resident in the ROM at the specified address data is emitted on the positive-going transition of the TABLE_CLK control signal. The sixteen-bit data word at output port CIR_Q is loaded into address counter 41 during the sixth clock pulse.

As mentioned above, the purpose of address counter 41 of FIG. 5 is to provide a sequence of memory addresses, starting at a selected count, for application to microinstruction EPROM 42, by which microinstruction EPROM 42 produces the microinstruction control signals needed to implement the requested command. Address counter 41 has four distinct modes of operation, a counting mode, a reset mode, a hold mode, and a load mode.

In the counting mode, each logic 0 to logic 1 transition of the input clock signal increments by one the binary output which appears at the AC_Q output port of the counter 41. In the reset mode, the output bits are all-zero. In the hold mode, the output count remains constant. In the load mode, the bit pattern applied to its input port AC_D is transferred to its output port. The operating mode of address counter 41 is established by two control signals, which are the LOAD signal applied to the L input terminal from path 45a, and the HOLD_CNT signal applied to the H_C input terminal from path 45b.

The operating mode of address counter 41 in responses to the control signals LOAD and HOLD_CNT is tabulated in Table 1.

TABLE 1

| FUNCTION | LOAD | HOLD_CNT |
|---|---|---|
| Load | 0 | 0 |
| Count | 0 | 1 |
| Reset | 1 | 0 |
| Hold | 1 | 1 |

The sixteen-bit beginning address of a sequence is loaded into the AC_D input port of counter 41 from the output port of the command index ROM 40 by assertion of logic 0 levels on both the L and H_C inputs. Once the starting address is loaded, the counting mode is started by raising the H_C input to a logic 1 level. The sixteen-bit output count addresses EPROM 42, and the address changes with the leading edge of each system clock pulse. Thus, a new microinstruction control word is accessed in EPROM 42 during each successive system clock cycle, until counting by counter 41 ceases.

The duration of counting by counter 41 is determined by TGS module 30 in response to the four-bit field CMD_TYPE applied to its I0-I3 input ports (where the hyphen represents the word "through"), and TGS module 30 asserts its control by way of the LOAD and HOLD_CNT signals. Each unique command results in a different number of effective clock ticks of address counter 41 before the counter is placed in the hold mode, which thus results in addressing a different number of microinstruction control words being provided by EPROM 42.

During the seventh system clock cycle following stabilization of the address lines applied to command index ROM 40, the command provided by the user is read and decoded. The decoded instruction is translated into a sequence of microinstruction control signals provided by EPROM 42, for application to the remaining circuitry in the CAM memory system over microinstruction bus (MIB) 49.

The microinstruction bits produced by EPROM 42 depend upon its programming, which allows the described system to be implemented with other types of CAMs, simply by changing the program in an appropriate manner. Thus, simply by knowing the parameters required for a CAM device, the micro-program Instruction EPROM can be programmed to provide the desired parameters. Furthermore, additional commands may be implemented in the EPROM 42 with corresponding starting addresses being added to the command index ROM 40 and corresponding instruction counts being implemented in the TGS module 30.

In operation, upon receipt of a DATA_WRITE command in the Command field of an input packet conforming to system requirements as illustrated in FIG. 2a, TGS module 30 decodes the Command field as described above, and the system is directed to the starting address of a block of microinstructions in EPROM 42 which implement the DATA_WRITE command. In FIG. 1, the signal latched to the outputs of data latch 32 is in two parts, the sixteen LSBs, the DATA_KEY bits, and the eight MSBs, the CAM_ADDR bits, which represent the destination CAM address and the starting or segment address of the extended memory. The 16 DATA_KEY bits are applied over a data path 34 to the A input port of an address and data selector 69 (U5). The eight CAM_ADDR bits are applied over a path 35 to the B input of address and data selector 69, where they are concatenated with additional eight bits from MIB bus 49. As described below, these additional bits define specific commands for the CAM 62.

Address and data selector 69, responsive to signals provided by the MIB 49, selects a sixteen-bit address from the A or B inputs, and applies it by way of its output port C to a bus 70. The selection is necessary, as described below, because extended data RAM 63 (U9) stores information packet(s) at locations specified by the CAM_ADDR field. During a comparison, however, the address at which the corresponding extended information is to be found for retrieval of the extended information is derived from a different location, and the particular source must be selected.

Figure 6:
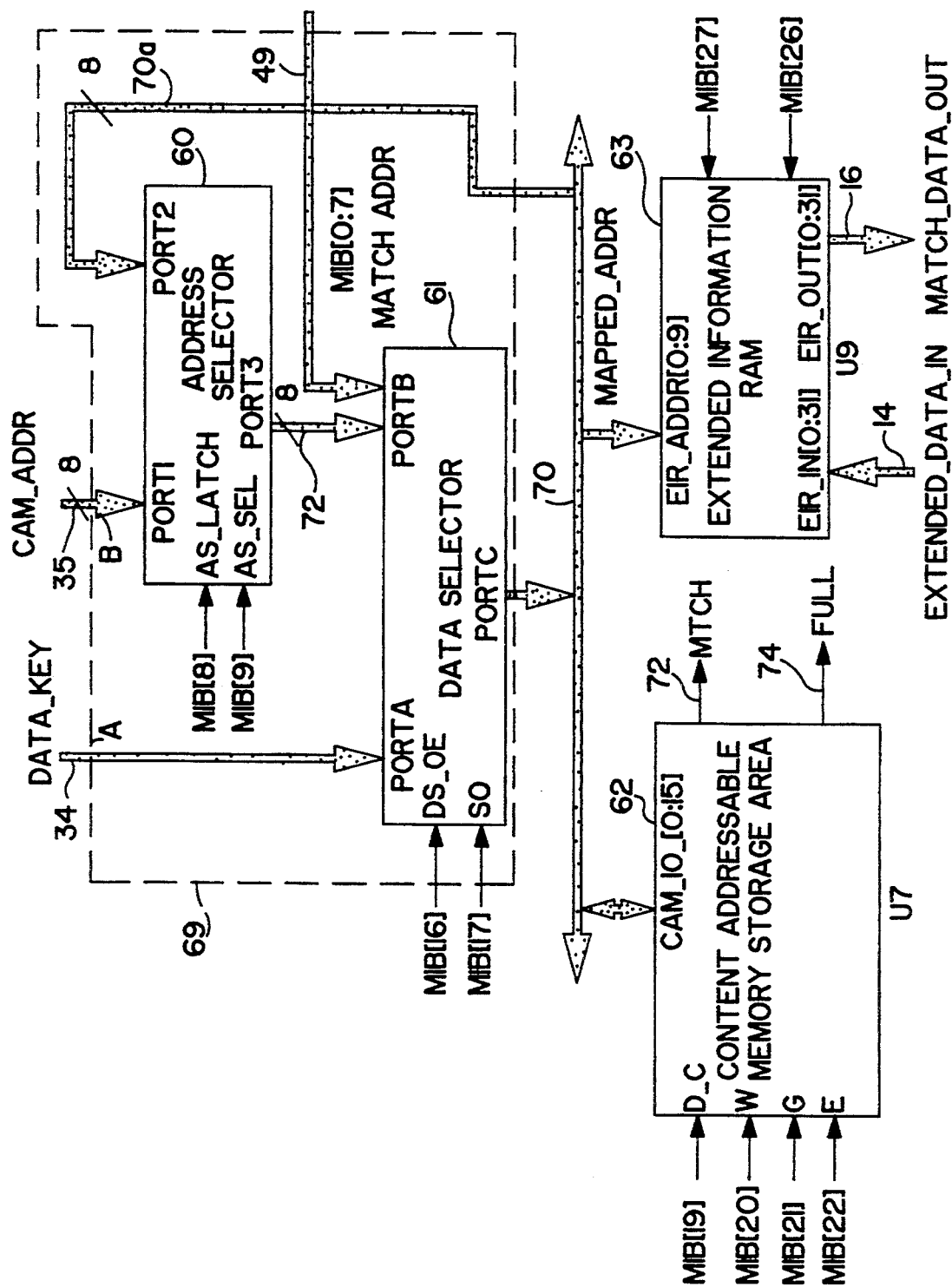
FIG. 6 is a simplified block diagram of the data selector, CAM and extended-information RAM of FIG. 1.

FIG. 6 shows the address and data selector 69 in more detail. In FIG. 6, the sixteen-bit DATA KEY field arriving over data path 34 from data latch 32 of FIGS. 1 and 4 is applied to a PORTA input port of a data selector 61, which is part of address and data selector 69. The eight-bit CAM_ADDR information arriving over data path 35 from data latch 32 is applied to a PORT1 input port of an address selection latch 60, which is also part of address and data selector 69. The PORT2 input port of address selector 60 receives the least significant byte (eight least significant bits) of the output of CAM 62 (the MATCH_ADDR signal) over a branch 70a of the bus 70.

In the FIGURES, CAM 62 is also designated UT. The MATCH_ADDR signal is the output of CAM 62 when a match is found between stored information and comparison information with which it is compared. Address selector 60 is essentially a multiplexer having a transparent and a latched mode of operation, which couples either the CAM_ADDR at its PORT1 input or the MATCH_ADDR at its PORT2 input to its PORT3 output. The function performed by the address selector 60 is determined by the microinstruction control signals AS_LATCH and AS_SEL applied via the MIB[8] and MIB[9] control lines, respectively. A logic 1 input to the AS_SEL input port of address selector 60 directs the PORT1 CAM_ADDR input to the PORT3 output port, and a logic 0 level directs the PORT2 MATCH-_ADDR input to the PORT3 output.

The AS_LATCH signal applied to the address selector 60 over the MIB[9] path acts as a latch or an enable signal, so a logic 1 level on the AS_LATCH allows the bit pattern of PORT3 to change to match the pattern at PORT1 or PORT2, as determined by the state of the AS_LATCH input, while a logic 0 level prevents a change or latches the current output. During a DATA_WRITE request, address selector 60 directs the CAM_ADDR signal to its PORT3 output, and during a compare-information request it directs the MATCH_ADDR signal to its PORT3 output.

The eight-bit PORT3 output of address selector 60 is coupled, by a data path 72, to the least-significant byte of the sixteen-bit value applied to the PORTB input of data selector 61. The most-significant byte portion of this sixteen-bit value is connected to the least-significant byte of the 32 bit microinstruction produced by EPROM 42 on MIB bus lines MIB[0:7].

Data selector 61 of FIG. 6 receives the sixteen-bit DATA_KEY information applied over data path 34 at its PORTA input port, as mentioned above. Data selector 61 is functionally similar to address selector 60. More particularly, data selector 61 transfers either the information at its PORTA or its PORTB input ports to its PORTC output port, depending upon the state of a control signal SO applied to its SO control input port from MIB bus 49 bit line MIB[17]. When a logic 1 level is applied to the SO input port, data selector 61 couples the DATA_KEY information from its PORTA input port to its PORTC output port when a logic 0 level applied to the SO control input port, the data selector 61 couples, to the PORTC output port, the signal applied to the PORTB input port. An enable/disable signal is applied from bit line MIB[16] to the DS_OE control input port of data selector 61. The data bits at output port PORTC are enabled for change when the DS_OE signal is in the logic 0 state, and they are latched or disabled when DS_OE is logic 1.

Functionally, the arrangement of data selector 69, including address selector 60 and data selector 61, permits the CAM_ADDR field output of data latch 32 to become the MAPPED_ADDR address used by the extended data RAM 63 during a DATA_WRITE request, but to use the address of the matched data key outputted from the CAM 62 as the MAPPED_ADDR input to the extended data RAM during a compare-information request.

Naturally, the specific instructions commanded by EPROM 42 depend upon details of the CAM structure, but EPROM 42 can be programmed to handle a wide variety of CAMs. In a particular embodiment of the invention, an Advanced Micro Devices Corp. type Am99C10A chip is used as the CAM device, the technical data of which appears in their 1992 CMOS Memory Products Databook. In FIG. 6, the CAM 62 is illustrated as having an input/output port CAM_IO coupled to bus 70, match indication output terminal 72, on which a MTCH signal appears, and an output terminal 74 at which a FULL signal is provided. In addition, CAM 62 has a D_C control input coupled to MIB[19], a W control input coupled to MIB[20], a G control input coupled to MIB[21], and an E control input coupled to MIB[22], for receiving microinstructions from EPROM 42 over bus 49.

The CAM is configured to the input data mode by setting E to a logic 0 (L), D_C to a logic 1 (H), G to a logic 1, and applying a negative-going pulse transition (a clock input signal) to the W input port. The CAM is configured to the command write mode by control signals E=L, D_C=L, W=C, and G=H, whereupon the data transferred to the CAM in the input data mode is stored in CAM at a location specified ba the CAM_ADDR field.

In FIG. 6, the extended data RAM 63 has a ten-bit EIR_ADDR input port coupled to bus 70 for receiving a segment address, and also has a 32 bit EIR_IN input port coupled to bus 14 for receiving extended information for storage. A pair of control input terminals designated WE (write enable) and Cs (chip select) couple the RAM 63 by way of MIB[26] and MIB[27], respectively, to microinstruction EPROM 42. RAM 63 also has an EIR_OUT output port, which is coupled by way of data line 16 to I/O buffer 10.

Figure 7:
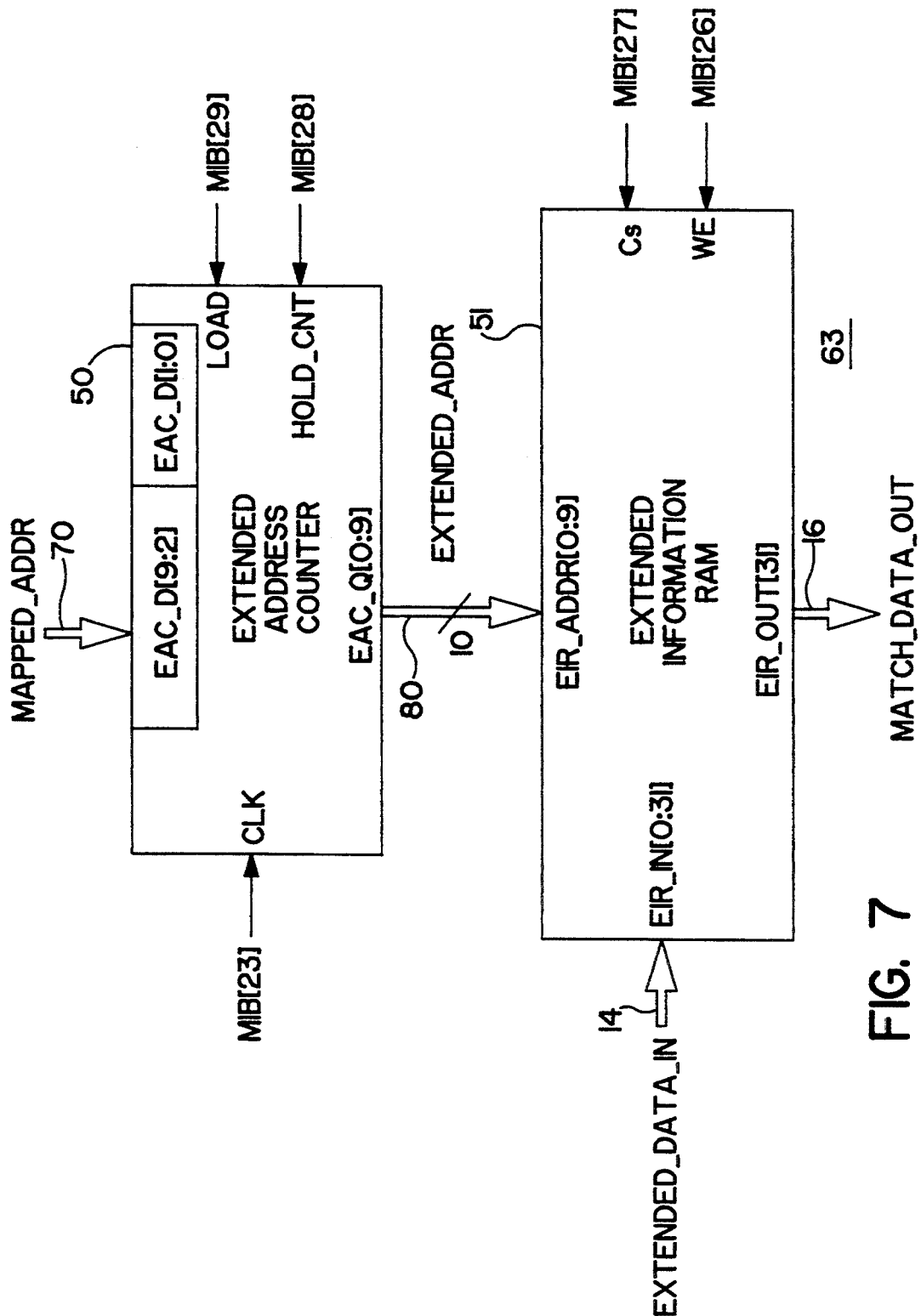
FIG. 7 is a simplified block diagram of the extended-information RAM of FIG. 6.

FIG. 7 is a more detailed block diagram of extended data RAM 63 of FIG. 6. In FIG. 7, RAM 63 includes an extended address counter 50 and an extended data RAM unit 51. The MAPPED_ADDR signal is applied over bus 70 to an EAC_D input port of extended address counter 50. Extended address counter 50 also receives system clock (CLK), Load, and Hold_Cnt microinstruction control signals by way of MIB[23], MIB[28], and MIB[29] control lines, respectively. Extended address counter 50 functions much like address counter 41 of FIG. 5, and the method of operation is not repeated here. In general, extended address counter 50 receives the current value of MAPPED_ADDR, and increments the count at each system clock pulse for a predetermined number of counts, to produce a monotonically incrementing ten-bit address, which is applied from the EAC_Q output port by way of a data path 80 to the EIR_ADDR input port of an extended data RAM unit 51. RAM unit 51 includes a 32 bit extended data input port EIR_IN coupled to data path 14, WE and Cs control input ports coupled to MIB[26] and MIB[27], respectively, and produces stored information at its EIR_OUT output port for application over data path 16.

Figure 8:
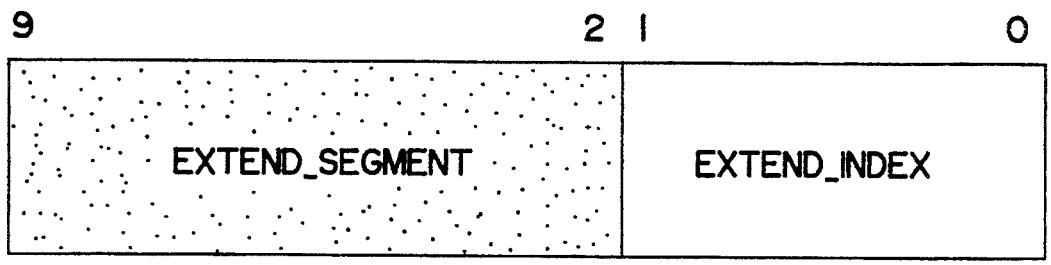
FIG. 8 illustrates the format of an EXTENDED_ADDR signal applied to a conventionally addressed extended-data RAM unit.

FIG. 8 is a representation of the digital format of the EXTENDED_ADDR word applied to extended data RAM 63 of FIGS. 6 and 7 by way of data path 80. In FIG. 8, the ten-bit EXTENDED_ADDR address word is divided into two sections, the most-significant eight-bit portion of which is designated EXTEND_SEGMENT, and the two least-significant bits of which are designated EXTEND_INDEX. The EXTEND_SEGMENT portion of the address is used to reference individual blocks of memory in the extended data RAM 63. There are 256 such blocks of memory in RAM 63, but of course the number of blocks of memory could be increased so long as the number of address bits were increased (or the number of words in each block were decreased) to accommodate the increased number of blocks. The EXTEND_INDEX portion of the address word of FIG. 8 is used to reference individual 32 bit words within each segment. Since there are only two such bits in the exemplary embodiment of the invention, only four 32 bit words can be accessed in each block, but this number can also be increased if desired.

During a DATA_WRITE request, the microinstruction EPROM 42 is sequenced to generate control signals which: (a) transfer the DATA_KEY information to the CAM 62 storage area, and (b) transfer a predetermined number of 32-bit words to extended data RAM 63, where the predetermined number of words so transferred constitutes the extended data portion of one extended information data packet. In the above mentioned specific embodiment, microinstruction EPROM 42 performs the following tasks in a sequential manner.

1. Configure data selector 61 (FIG. 6) to transfer data from its PORTA input port to its PORTC output port by asserting logic 1 on terminal SO via MIB[17].
2. Enable the output of data selector 61 by asserting a logic 0 on terminal DS_OE via MIB[16]. This places the DATA_KEY information on bus 70 and at CAM 62 I/O port CAM_IO.
3. Configure CAM 62 to the input data mode by setting E=L, D_C=H, W=C, and G=H. At this point, the 16-bit DATA_KEY is loaded into the CAM 62.
4. Configure address selector 60 to route the CAM_ADDR signal, applied to its PORT1 input port, to its PORT3 output port, by asserting a logic 1 on terminal AS_SEL via MIB[9], then latch the value at the PORT3 output port by applying a logic 0 to the AS_LATCH terminal.
5. Reconfigure data selector 61 to couple data from its PORTB input port to its PORTC output port, by applying a logic 0 to the SO terminal via MIB[17] while leaving the DS_OE signal at logic 0. This results in transfer of the PORTB input signal to output port PORTC, where the PORTB signal is the eight-bit CAM_ADDR field in the least significant byte of PORTB, with the most-significant byte supplied by the least significant byte of 32-bit microinstruction bus 49 (i.e. MIB[0:7]). The sixteen-bit combination, now designated MAPPED_ADDR, has CAM_ADDR in the EXTEND_SEGMENT field, and is applied by way of bus 70 to the CAM_IO port of CAM 62.
6. Configure microinstruction bits on bus 49 MIB[0:7] to represent a store command for CAM 62, which for the example would be 0×E0. This value becomes the more significant byte of the sixteen-bit MAPPED_ADDR.

7. Set CAM 62 to the command write mode by setting E=L, D_C=L, W=C, and G=H on MIB[19:22] respectively. This step results in the storage of the DATA_KEY field in CAM 62, at the location specified by the CAM_ADDR field.

At the end of the seven steps set forth above, the DATA_KEY field is stored in CAM, but the extended information must still be stored. This is accomplished by the following steps:

8. Disable the CAM device by setting its control signal E to a logic 1.
9. Configure the extended address counter 50 of FIG. 7 to the load mode by setting its Load and HOLD_CNT inputs logic 0. In this mode the counter 50 transfers and latches the eight-bit MAPPED_ADDR value concatenated with two logic 0's in the least-significant bit positions to its output port.
10. Set the control inputs of the extended address counter 50 to the count mode by setting the signal LOAD to logic 0 and the signal HOLD_CNT to a logic 1, whereby the clock input causes the EXTENDED_ADDR applied to extended data RAM unit 51 to increment.
11. Assert MIB[31], which is connected to the READ control input port of I/O buffer 10. to cause the first of four 32 bit words of an extended information packet to be read.
12. Configure the extended data RAM 51 to the WRITE mode by first asserting WE to logic 0 by way of MIB[26], followed by a transition of the signal Cs (MIB[27]) from logic 1 to logic 0 and back to logic 1. This transfers data from input buffer 10 to the memory location specified by the ten-bit EXTENDED_ADDR field.
13. Increment the extended address counter by asserting its Clk input from logic 0 to logic 1. This prepares extended data RAM unit 51 to accept data into the next 32 bit word location within the same segment.
14. Repeat steps 11, 12, and 13 three more times, to thereby transfer to the extended data RAM the three additional 32 bit extended information words.

The incrementing of the address causes the 32 bit words in each segment of RAM to be addressed sequentially. Each new EXTEND_SEGMENT field of FIG. 8 references a new extended information packet within RAM 51.

Retrieving data from the system of FIGS. 1 and 3-6 is accomplished in much the same manner as that described above for writing, because the user interface is constant. A user simply places commands into input buffer 10, and the system, sensing a non-empty buffer, fetches commands and related information from the buffer and processes it. The timing and control signals produced by TGS module 30 are the same for both the writing and the reading sequences, with the only differences arising after control is transferred to microinstruction EPROM 42. Retrieving data is accomplished by the compare-information command.

In general, when a COMPARE command occupies the most-significant byte of the 32-bit information packet in I/O buffer 10 of FIGS. 1 and 3, the least-significant sixteen bits are used as a search key, as described in conjunction with FIG. 2c. Thus, in response to a COMPARE command, the system searches the data previously stored in the CAM 62 for copies of the search key. The data keys are modified by mask keys, also previously stored. The current search key is stored in a Comparand register (not shown), which is internal to CAM 62. The contents of the Comparand register are then presented to all the CAM storage sites in parallel fashion. If a match is found between the search key and the previously stored data keys, the extended data packet associated with each matching data key is returned to the user. If multiple matches are found, a plurality of extended information packets are placed in the I/O buffer. The placement of information into the I/O buffer is accompanied by assertion of a logic 0 OUTPUT_READY signal on control line 12e of the EDIO bus, which thus indicates a discovered match of the data. Microinstruction EPROM provides the specific instructions to carry out the compare-information request 1. Configure data selector 61 to transfer data from its PORTA input to its PORTC output by applying a logic 1 to its S0 input terminal. This prepares the SEARCH_KEY portion of the compare-information request for transfer to CAM.
2. Enable the output of data selector 61 by asserting DS_OE to a logic 0 level.
3. Disable extended data RAM 63 by asserting to a logic 1 level its Cs control signal port.
4. Configure CAM 62 by setting its four control ports E=L, D_C=H, W=C, and G=H.

In the described exemplary embodiment, the configuration performed in step 4 of the compare-information request as described also initiates a comparison cycle between all the previously stored DATA_KEY fields which reside in CAM 62 with the just-presented SEARCH_KEY field. These comparisons are performed in parallel.

If no match is found after step 4, TGS module 30 disables address counter 41, to suspend the addressing of microinstructions in EPROM 42, which effectively terminates the compare-information cycle. If a match is found by CAM 62 between the SEARCH_KEY and at least one of the DATA_KEYs, the MTCH output port of CAM 62 asserts a logic 0 on control line 72, which is coupled to TGS module 30. TGS module 30 responds by allowing address counter 41 to continue counting and addressing EPROM 42, thereby producing additional microinstructions to continue the compare-information processing. Additionally, CAM 62 gates the address, in the CAM 62 of the first matched DATA_KEY to its CAM_IO port and to bus 70. The steps and associated microinstructions which are allowed in order to continue the compare-information request are:

5. Disable output port PORTC of data selector 61 of FIG. 6 by asserting DS_OE to a logic 1 level on MIB[16]. This maintains the current CAM address during steps six and seven, below.
6. Configure address selector 60 of FIG. 6 to route data from its PORT2 input to its PORT3 output by applying a logic 0 value, on MIB[9], to the AS_SEL terminal. This routes the match address from CAM 62 through PORT2 to PORT3.
7. Latch the data currently at the PORT3 output of address selector 60 by switching its AS_LATCH input port from a logic i to a logic 0 level. This action also causes the address of the most recently matched word from CAM 62 to be latched and available at the PORTB input of data selector 61.
8. Disable CAM 62 by asserting control signal E to a logic 1 level. This has the effect of holding the CAM state while the current match address is processed.

9. Enable output PORTC of data selector 61 by applying a logic 0 value, via MIB[16] to the DS_OE terminal.
10. Configure data selector 61 to transfer data from its PORTB input to its PORTC output by asserting the SO signal on MIB[17] to a logic 0 level. The least-significant byte of which is latched at the PORTC output of data selector 61 is the starting address of the EXTEND_SEGMENT portion of the address in extended data RAM 63 at which the extended data corresponding to the matched data is stored.
11. Assert a logic 0 on MIB[28] (Hold_Cnt) and Load MIB[29], to cause the extended address counter (FIG. 7) to load the extended data starting address from bus 70.
12. Place the extended address counter 50 in its counting mode by leaving the Load signal on MIB[29] logic 0, and setting the Hold_Cnt signal on MIB[28] logic 1. Extended address counter 50 will now count each time the CLK signal on MIB[23] goes from logic 0 to logic 1 and back to logic 0.
13. Read extended data RAM 51 by setting control signal WE on MIB[26] to a logic 1 and control signal Cs on MIB[27] to a logic 0. The 32-bit EXTENDED DATA word corresponding to the data matched in CAM appears at Match_Data_Out data path 16, and is applied to the OUTD input port of FIFO buffer 21 of FIG. 3.
14. Write the 32-bit EXTENDED DATA word from Match_Data_Out data path 16 into FIFO buffer 21 by setting the OUTW signal on MIB[24] from logic 1 to logic 0 and back to logic 1 again synchronous with the system clock signal. This writes the first one of the 32-bit words from extended data RAM 51 into I/0 buffer 10 of FIG. 1. This is accomplished in three successive control words provided by the PROM 42.
15. Increment extended address counter 50 of FIG. 7 by asserting its CLK input from logic 0 to logic 1 and back to logic 0 on MIB[23]. The incremented address appears on data path 80.
16. Repeat steps 13 to 15 three more times to read the remaining three 32-bit EXTENDED DATA words associated with the matched CAM data, and to load them into I/O buffer 10 of FIG. 1 ready for retrieval.
17. To determine if CAM 62 has found any more matches than the one for which the extended data was just retrieved, the CAM is enabled by applying a logic 0 as the E control signal on MIB[22], and the command is issued by the PROM 42 to set the Skip-Bit cell control bit, associated with the address which was just matched, to logic 1. This action disables this particular DATA_KEY location from participation in a match. In the case of multiple matches, the output of CAM 62 will now reflect the address of the next matched address, or if there are no further matches, the MTCH output signal placed on data path 72 by CAM 62 will become logic 1.
18. If the MTCH output signal of CAM 62 is still logic 0 after step 17, then repeat steps five to seventeen, otherwise quit.

The write-mask cycle begins when the user places a MASK_WRITE command in the CMD field of an input packet, in the format illustrated in FIG. 2b. TGS module 30 decodes the CMD field as described above, and directs the system to the starting address of a block of microinstructions in microinstruction EPROM 42 which, in concert, implement the MASK_WRITE command. Referring to FIGS. 1 and 4, the output of data latch 32 is segregated into an eight-bit byte which is applied to data path 35, and a sixteen-bit portion of lesser significance, which is applied to data path 34. The MASK_KEY appears on sixteen-bit path 34 at the output of data latch 32. The MSB portion on data path 35 is not used, because it is blocked by the control states of the data latch. The sixteen-bit MASK_KEY is applied from data path 34 to the PORTA input port of data selector 61 of FIG. 6. The eight-bit CAM_ADDR field on data path 35 is coupled to the PORT1 port of address selector 60. The most significant eight-bit byte of PORTB of data selector 61 receives signal over MIB[0:7] from the least significant byte of the 32 bit output of microinstruction EPROM 42.

During the MASK_WRITE cycle, the microinstructions cause the system to transfer the data presented to the PORTA input of data selector 61 into the internal mask register of CAM 62. The specific tasks of the described embodiment, and the associated instructions, are:

1. Apply a logic 1 level, via MIB[17] to the terminal SO to configure data selector 61 to couple data from its PORTA input port to its PORTC output port.
2. Assert a logic 0 signal, via MIB[16], on the terminal DS_OE to enable the output of data selector 61 to change to the new bit configuration.
3. Configure CAM 62 to the input data mode, and transfer the data present on bus 70 to the CAM, by applying to the CAM input ports E=L, D_C=H, W=C, and G=H, using the same convention described above.
4. Configure address selector 60 to route its PORT1 input signal to its PORT3 output port, by applying a logic 0 to AS_SET, via MIB[9], followed by switching the AS_LATCH signal on MIB[8] from a logic 1 to a logic 0 level.
5. Configure data selector 61 to transfer data from its PORTB input to its PORTC output by setting the SO signal on MIB[17] to a logic 0 level. The LSB portion of the PORTB input signal is the eight-bit CAM_ADDR field, and the eight-bit MSB portion of the PORTB input signal is the eight-bit LSB portion of the microinstructions, which appear on MIB[0:7].
6. Set the bits on MIB[0:7] to represent the MASK_WRITE instruction required by CAM 62, which for the described example is 0×30. This makes the command for writing to the mask register of CAM 62 available on its input port CAM_I/O.
7. Command CAM 62 to write into the internal mask register by the write mode command on MIB[19:22], more specifically by setting E=L, D_C=L, W=C, and G=H, pursuant to the above mentioned convention. CAM 62 then writes the MASK_KEY to its internal mask register in accordance with the command originating on MIB[0:7]

A content-addressable memory as described in conjunction with FIGS. 1-8 may be used as a real-time event scheduler or dispatcher. This may be accomplished by making the DATA_KEY fields represent specific times, such as starting and/or ending times of specific programs.

For example, a specific time may be 12:30 AM. The data which is stored in extended data RAM is data associated with the program which is to start or end at the particular time, such as the title, the channel on which it is to be broadcast, its status (playing, stopped, queued, etc.), and its program identification number. As a particular example, the CAM may contain the scheduled start and stop times of programs which are to be broadcast over a video network. A collection of related data (i.e. a database record), which may be used to describe a specific one of the television programs, may be described as a Structure in the C programming language as:

```
struct broadcast_program {
    short start_time;          /* start and end times of program */
    short end_time;
    short program_id;          /* program identification number */
    short physical_src_location;      /* program address */
    short address_on_src;             /* on media */
    short broadcast_channel;   /* channel of broadcast */
    char status;               /* playing, stopped, queued, etc. */
    char address_in_CAM        /* used this address in the CAM */
    char application_specific_storage[2];
    struct database *program_database:    /* pointer to more */
                                          /* about program */
};
```

Where a "short" is a sixteen-bit entity, and a "char" is an eight-bit entity.

The "start_time" and the "end_time" values are stored in the content-addressable portion of CAM 62 in the form of DATA_KEY information. The remainder of the information associated with or relating to the programs is stored in the extended data RAM as two extended information data packets. The first of the extended information data packets relates to program start time, and the second relates to the program end time.

Figure 9:
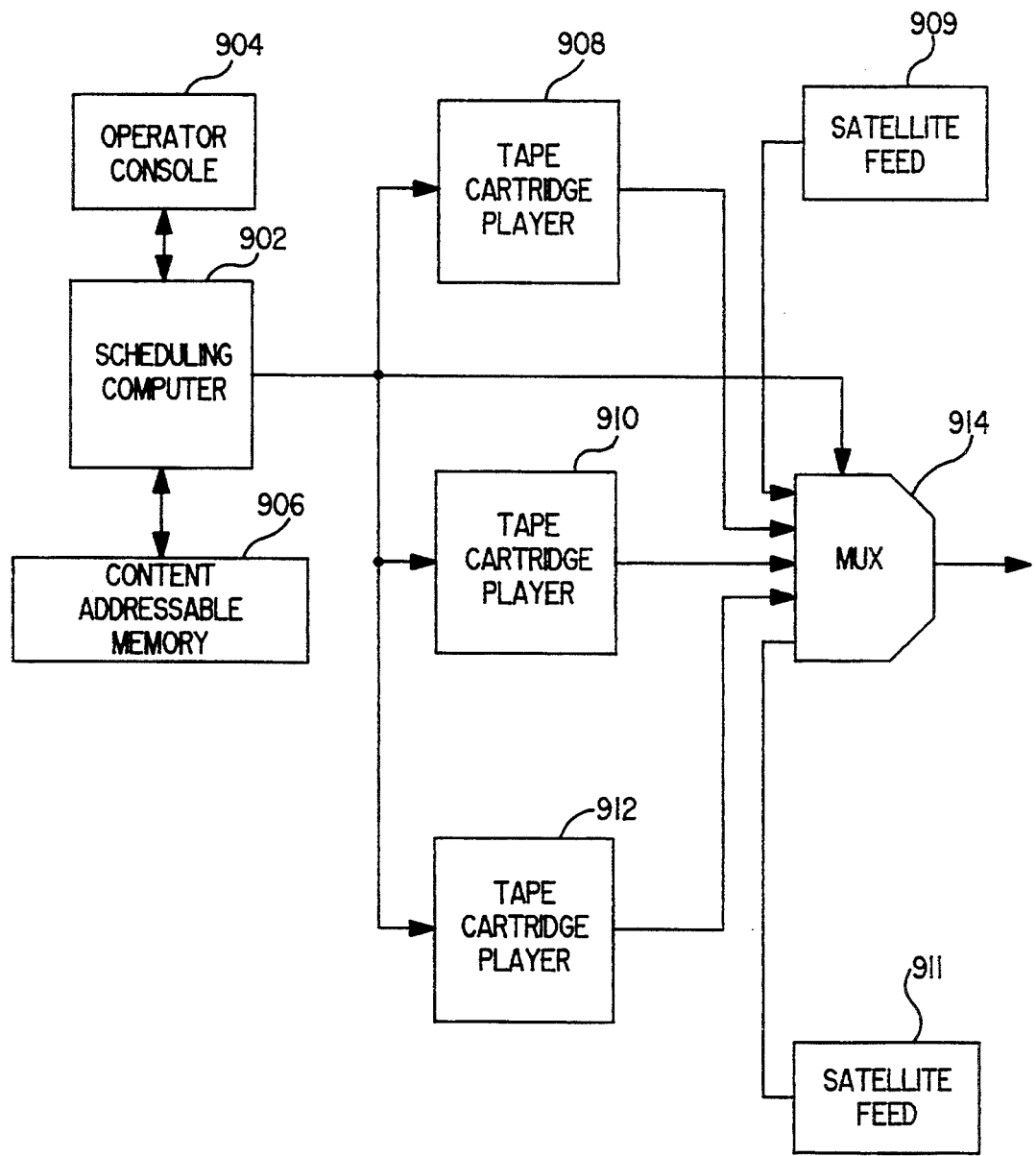
FIG. 9 is a simplified block diagram of a television program scheduling system which includes an embodiment of the present invention.

An exemplary program scheduling system which uses an embodiment of the invention is shown in FIG. 9. In FIG. 9, a scheduling computer 902 which is coupled to an operator console 904. Using the console 904, an operator, for example the program manager of a cable television station, may enter a schedule for programs to be broadcast over the network. This schedule is stored in the content addressable memory 906, as described above.

The programs that are to be broadcast may originate from a satellite feed such as 909 and 911 or from a tape cartridge player such as 908, 910 and 912. Each of the tape cartridge players may hold multiple programs, each on a separate tape.

As shown in the exemplary database record, each program is identified by three fields, program_id, physical_src_location and address_on_src. The first field simply identifies the program, the second field, physical_src_location, identifies the source of the program. In the described embodiment, this may be any one of the satellite feeds or tape cartridge players. The third field, address_on_src, identifies a particular program which may be provided by the source. In the case of a tape cartridge player, this may be a particular tape cartridge or even a particular tape count value on a particular tape cartridge. On a satellite feed, this address may be a particular satellite transponder.

In operation, the content addressable memory system 906 is loaded by a scheduling program from the scheduling computer 902 which may, for example, be a personal computer. The scheduling program uses DATA_WRITE commands, to store all the television programs for a particular period of time. The HOST_WRITE input control signal is attached to the interrupt control line of a real-time clock. The real-time clock periodically, for example once per minute, generates an interrupt, which places the current time or a time somewhat in advance of the current time on the EDIO input bus. The Command field of the input data is set for continuous Compare-Information requests, for comparing the current time with the stored time. This allows continuous comparison of the current time with the starting or ending times of all the stored programs, and identification of those which are required to start and stop at the current time, without any intervention by a scheduling computer 902.

When a time is provided to the memory 906 which corresponds to the start or stop time of one or more programs, the memory 906 automatically returns the database records for the programs to the scheduling computer 902. In response to this data, the computer 902 causes one tape cartridge player (e.g. player 908) to stop playing the program and causes another tape cartridge player (e.g. player 910) to simultaneously start another program. Each of these cartridge players is identified in the respective returned database record. As shown in FIG. 9, all of the possible sources are coupled to a multiplexer 914. The scheduling computer 902 also controls the multiplexer 914 to determine which of the signals is to be passed on to the cable. In simplified system shown in FIG. 9, only one cable channel is illustrated. It is contemplated, however, that an actual system may include equipment for many more cable channels and have a content addressable database which holds a relatively large number of records. For maximum flexibility, each source would be coupled to a plurality of multiplexers, each multiplexer corresponding to a different cable channel.

Other embodiments of the invention will be apparent to those skilled in the art. For example, while 32-bit command and EXTENDED DATA words have been described, other numbers of bits may be used, and different numbers of bits may be used for the command and the EXTENDED DATA words, and the number of bits may even differ among the EXTENDED DATA words themselves. The number of bits allocated within the command word to the various fields, such as the Command field, the CAM_ADDR field, and any of the KEY fields, may differ from those described, depending upon the specifics of the application.

Furthermore, the function performed by microinstruction EPROM 42 of FIGS. 1 and 5 may be performed by any type of ROM or nonvolatile memory, instead of an EPROM. The CAM system may be used for other applications than the above described scheduling. For example, in the case of books, page numbers or subject indices may be stored as DATA_KEY information, with the page or subject stored as extended data, thereby allowing quick retrieval of information based on page or subject. Similarly, compressed audio or speech fragments may be stored as DATA_KEY information, with extended passages of the associated audio message stored as extended information. In a video context, storing the video frame numbers as DATA_KEY information and the associated video frame as the extended data allows instantaneous access by frame number, rather than requiring sequential access by incrementing frames.

Furthermore, it is contemplated that the allocation and deallocation of database records may be accomplished internal to the content addressable memory system. In one exemplary scheme, the host processor may issue a DEALLOCATE command, specifying a search key. The CAM memory would find all instances of the search key and change them, in the CAM memory 62 to a value, for example, zero, which indicates that the CAM entry is available. Instead of specifying a CAM address in a DATA_WRITE command, the exemplary system would only specify a DATA_KEY. Prior to storing the data, the CAM memory system would search the CAM MEMORY 62 for an available entry and store the DATA_KEY entry in the first such entry that is returned.

While the invention has been described in terms of exemplary embodiments, it is contemplated that it may be practised as outlined above within the spirit and scope of the appended claims.

The invention claimed is:

1. A memory system for holding a plurality of blocks of data, each of said blocks of data including a key portion and an extended portion, and for fetching said extended portion of said blocks of data from memory in response to a search key, said system comprising:
    means for storing the key portion of each data block into a content addressable memory (CAM) at a respective predetermined address;
    means for storing the extended portion of each of said blocks of data into a further memory, at an address derived from the respective predetermined address;
    means for searching the CAM using the search key, wherein, when the search is successful, the CAM provides an address value corresponding to the search key;
    generating a starting address value in the further memory from the address value provided by the CAM;
    fetching the extended portion of each of said blocks of data stored in the further memory at the starting address values.

2. A content addressable memory system, for writing data including a key portion and an extended portion, and for reading said extended portion in response to a search key in association with said key portion of said data, said system comprising:
    an addressable random access memory portion, each datum of which is identified by a location address;
    a content-addressable memory portion, including a plurality of memory data organized into words, each of said words of said content-addressable memory portion being identified by a CAM word address;
    writing means coupled to said random access memory and to said content-addressable memory for writing said key portion of said data into said content addressable memory at a selected address of said content-addressable memory, and for writing said extended portion of said data into said addressable random access memory in a segment of data of said random access memory which begins with a segment address which corresponds with said selected address at which said key portion is written into said content addressable memory; and
    reading means, coupled to said random access memory and to said content-addressable memory for retrieving data from said random access memory, said reading means including:
        means for simultaneously searching at least a portion of said data of said content-addressable memory in which said key portion of said data is stored for a match between said key portion of said data and at least a portion of a search key, to identify the address of at least one of said selected addresses of said content-addressable memory at which a match is found, and for providing the identified address as an output address value;
        means for addressing said segment of data of said random access memory which begins with said address of said one of said selected addresses of said content-addressable memory at which a match is found, and
        means for reading said extended data associated with said key portion which is matched with said portion of said search key.

3. A system according to claim 2, wherein said reading means comprises extended address counting means, coupled to said random-access memory, for receiving a starting address of said segment of data, and for determining a plurality of addresses within said segment of data beginning with said starting address.

4. A system according to claim 3, wherein:
    said starting address is obtained by concatenating N zero-valued bits to the output address value in less significant bit positions, where N is a integer; and
    said plurality of address values within said segment are determined by incrementing said starting address value $2^N-1$ times.

5. A method for writing a block of data into a memory said data block including a key portion and an extended portion, and for fetching said extended portion of said data from memory in response to a search key, said method comprising the steps of:
    storing the key portion of the data block into a content addressable memory (CAM) at a predetermined address;
    storing the extended portion of the data into a further memory, at an address derived from the predetermined address;
    searching the CAM using the search key, wherein the CAM provides the predetermined address when the search key matches the key portion;
    generating a starting address value in the further memory from the predetermined address provided by the CAM;
    fetching the extended portion of the data stored in the further memory at the starting address values.

6. A method according to claim 5, wherein the block of data is provided to the CAM and to the further memory as a single command, without intervening commands.

7. A method according to claim 6, wherein the block of data provided to the CAM and to the further memory is a database record.

8. A scheduling system for executing a predetermined set of events in a preset sequence comprising:
    a scheduling computer for receiving information on the events to be scheduled, wherein information on the events is received in an order different from said preset sequence and wherein the received information for each event includes a time data value indicating when, in the preset sequence, the event is to occur;
    a content addressable memory system, coupled to the scheduling computer, including:
        means for storing the time data into a content addressable memory (CAM) at a predetermined address and for storing the information in an auxiliary memory at a corresponding address determined from the predetermined address;
        means for receiving a further time data value generated while executing said predetermined set of events from the scheduling computer and for returning, address values in the CAM of all time data values which match the received further time data value;

means, responsive to the returned address values for determining the corresponding addresses in the auxiliary memory, and for fetching the information stored at the corresponding addresses; and means for providing the fetched information to the scheduling computer; and means, responsive to the fetched information, for executing the events represented by the fetched information.

* * * * *